Patented June 1, 1926.

1,586,704

UNITED STATES PATENT OFFICE.

JAMES DENNIS ROOTS, OF LONDON, ENGLAND.

APPARATUS FOR CONTROLLING THE DELIVERY OF GLASS FROM FURNACES TO MOLDS AND THE LIKE.

Application filed September 25, 1920. Serial No. 412,747.

The object of my invention is to provide a better and simpler method of and means for the control and delivery of molten glass from a glass furnace or extension thereof for supply to molds and the like in definite desired quantities for the manufacture of articles in glass such as bottles, jars and the like, than has hitherto been devised.

Another object of the invention resides in the provision of means for controlling the discharge of glass by the creation of a vacuum within the furnace or extension thereof, the discharge of glass being broken or stopped during the formation of the vacuum and the glass being discharged when the vacuum is broken.

A further object resides in the provision of a plunger adapted to be immersed in the molten glass, the upward movement of the plunger creating a vacuum within or beneath the plunger to stop the discharge of the glass and the lowering of the plunger breaking the vacuum and allowing the discharge of the glass.

Still another object consists in forming the plunger with an air vent and valve so that air may be ejected from the plunger during its initial immersion in the molten glass.

Still a further object resides in the provision of means for operating the plunger by the operation of the revolving table which carries the glass receiving receptacles, the operation of the plunger being so timed as to bring a new receptacle beneath the discharge opening for the reception of the glass upon each downward movement of the plunger.

With the above and other objects in view which will appear as the description proceeds, my invention consists in the novel details of construction and arrangement of parts, described in the following specification and illustrated in the accompanying drawings, and while I have illustrated and described the preferred embodiments of the invention, as they now appear to me, it will be understood that such changes may be made as will fall within the scope of the appended claims.

A is the furnace extension and B the furnace, C is the hollow cylindrical plunger which may be conveniently made in firebrick or like heat resisting material, the rod $C^1$ of which is passed upwardly through the aperture $A^1$ in the top wall of the extension and is connected outside the extension with the metallic plunger rod D which fits within and is adapted to slide within the guide E, which guide is secured on the top of the extension.

The plunger rod E is connected at its upper end by means of a pin and fork to the lever F which is fulcrumed on the fulcrum pin $F^1$. The fulcrum pin is carried by the bracket G which is secured to the top metallic plate of the extension, the other arm of the lever F is pivotally joined to the rod H having a slide thereon $H^1$ adapted to slide in the guide I which is secured to a bracket also mounted upon the top metallic plate of the furnace extension. The joint pin holes in each end of the lever are slotted to allow of the arc movement.

A spring J is fitted between the bottom of the guide I and a collar $J^1$ secured to the rod H which spring serves to effect the upward stroke or movement of the hollow cylindrical plunger C.

A second guide K is provided for the lower end of the rod H which guide is secured by a bracket to the lower metallic plate of the extension A. The bottom end of the rod H is provided with a fork and a roller L of the usual kind adapted to engage the cam bosses or projections upon a ring cam M which ring cam may be secured to the rotating table N. The rotating table is of the usual type or construction for carrying the molds O.

It will be obvious that the number of bosses or projections on the cam ring M should be of the same number as the molds O on the rotating table N.

Figure 1:
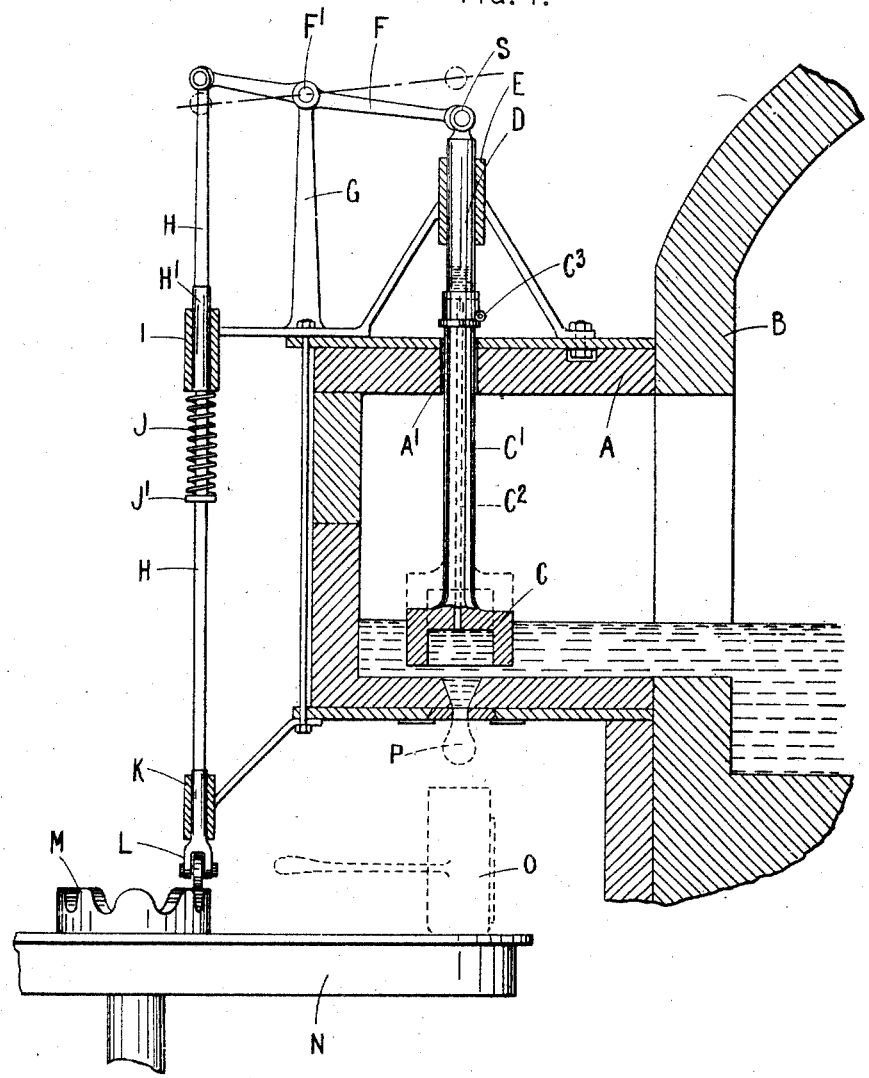
Fig. 1 is a vertical section through an extension of a furnace showing the hollow cylindrical plunger at the bottom of its stroke, and with means for operating the plunger.

The plunger C in Fig. 1 is shown at the bottom of its stroke. In commencing operation it is convenient to allow the air from the interior of the plunger if there should be any, to be exhausted to more readily permit the molten glass to flow into and fill the interior. This may be effected by means of the bore or channel $C^2$ formed concentrically within the rod $C^1$. A cock or valve $C^3$ is fitted to the top of this rod which can be opened at the commencement of operation to allow the air to flow out. The cock $C^3$ is then closed and not usually otherwise required.

Figure 2:
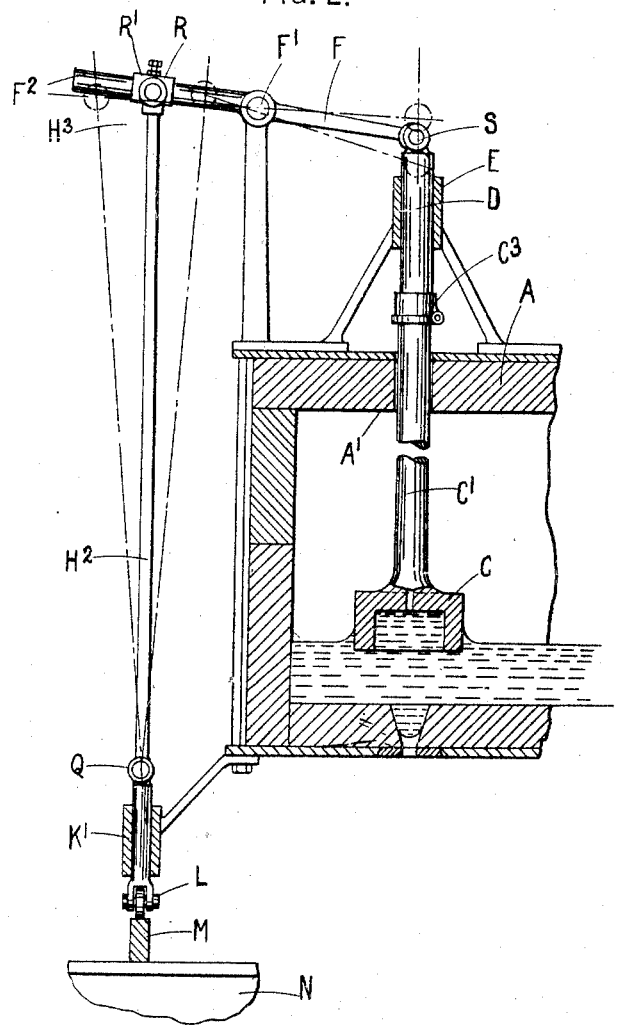
Fig. 2 shows a section with the hollow plunger at the top of its stroke and with a different arrangement for operating the plunger.

Referring to Fig. 2 this shows the plunger C at or about the top of its stroke lifting the glass away from the neighborhood of the outlet or discharge aperture P by means of the said vacuum which is formed or tends to be formed within the hollow cylindrical plunger C by lifting same and by the viscosity of the glass. In Fig. 2 is shown the means for effecting a variable throw or stroke, when desired of the plunger C. The rod $H^2$ is jointed at Q and has only one guide $K^1$, the sliding portion of the rod $H^2$ is provided at its lower end with a similar fork and roller L to that shown in Fig. 1, the single cam boss $M^1$ in this figure being shown in section.

The upper end of the rod $H^2$ is provided with a sleeve R mounted on a fork $H^3$ formed at the top of the rod $H^2$ and adapted to oscillate therein. The sleeve is provided with a set screw $R^1$ as means for adjustment whereby the sleeve R, the set screw $R^1$ being released may be slid along the lever arm $F^2$ to the required or determined position at a suitable distance from the fulcrum $F^1$ so as to suitably vary as desired the stroke of the plunger C.

When it is desired to stop the outflow from the discharge aperture P during an interval, as for example, during the dinner hour, the pin S may be removed from the top of the plunger rod which will allow the plunger C to drop and close the aperture P preventing outflow therefrom.

From the above detailed description it is thought that the construction and operation will be clearly understood. The glass is adapted to be discharged into the receptacles O, carried by the rotatable table N through the discharge opening in the bottom of the extension of the furnace. The discharge of the glass through the opening is controlled by the reciprocating plunger C which is operated by the rotation of the table N by means of the cam ring M, the rod H, the lever F, and the plunger rod C'. As the plunger is raised a vacuum is created to stop the flow of the molten glass through the discharge opening. As the plunger is lowered the vacuum will be broken and the glass allowed to drop by gravity, aided by the pressure of the lowering of the plunger, through the discharge opening of the extension into the receptacle O. The lower end of the plunger will always be immersed in the molten glass and in order that it may be initially immersed a discharge passage is provided through the plunger and plunger rod for the ejection of the air. The upper end of the passage is closed by means of a valve. It will be noted that the operation of the plunger is so timed with the rotation of the revolving table N that a new receptacle will be carried in position to receive the glass upon each downward movement of the plunger. The ordinary shears will be provided for cutting the glass and may be operated in any suitable manner such as by the rotatable table. The cam ring M may be detachably connected to the table so that cam rings of various curvatures may be used for regulating or adjusting the operation of the plunger.

What I do claim as my invention and desire to secure by Letters Patent is:—

1. An apparatus of the character described including a receptacle for containing molten glass, said receptacle having a discharge opening therein, a plunger mounted to reciprocate relative to the receptacle and for controlling the discharge of glass through the opening, said plunger including a hollow stem and an enlarged recessed head, the hollow stem allowing the exhaust of air from the head whereby glass may be received in the recess of the head at all times, and means for raising and lowering the plunger, said plunger when being raised creating a vacuum to raise the glass and cut off discharge thereof through the opening and when being lowered discharging the glass through the opening.

2. An apparatus for delivering glass from an aperture in a receptacle comprising a plunger immersed in the glass over the aperture, means for exhausting the air from the plunger and holding a vacuum therein, and means for reciprocating the plunger.

3. An apparatus for delivering glass from an aperture in a receptacle comprising a plunger having a rod with a passage therethrough and an enlarged head provided in its under surface with a recess communicating with the passage in the rod, said enlarged head being positioned over the aperture in the receptacle and its lower edge being immersed in the glass at all times, means for reciprocating the plunger, said means limiting the downward movement of the plunger so that in its lowermost position the lower edge of the enlarged head will be spaced from the bottom of the receptacle, and means for creating a vacuum through the passage in the plunger rod so that in the upward movement of the plunger the recess in the enlarged head will remain filled with the glass.

JAMES DENNIS ROOTS.